Figure 1:
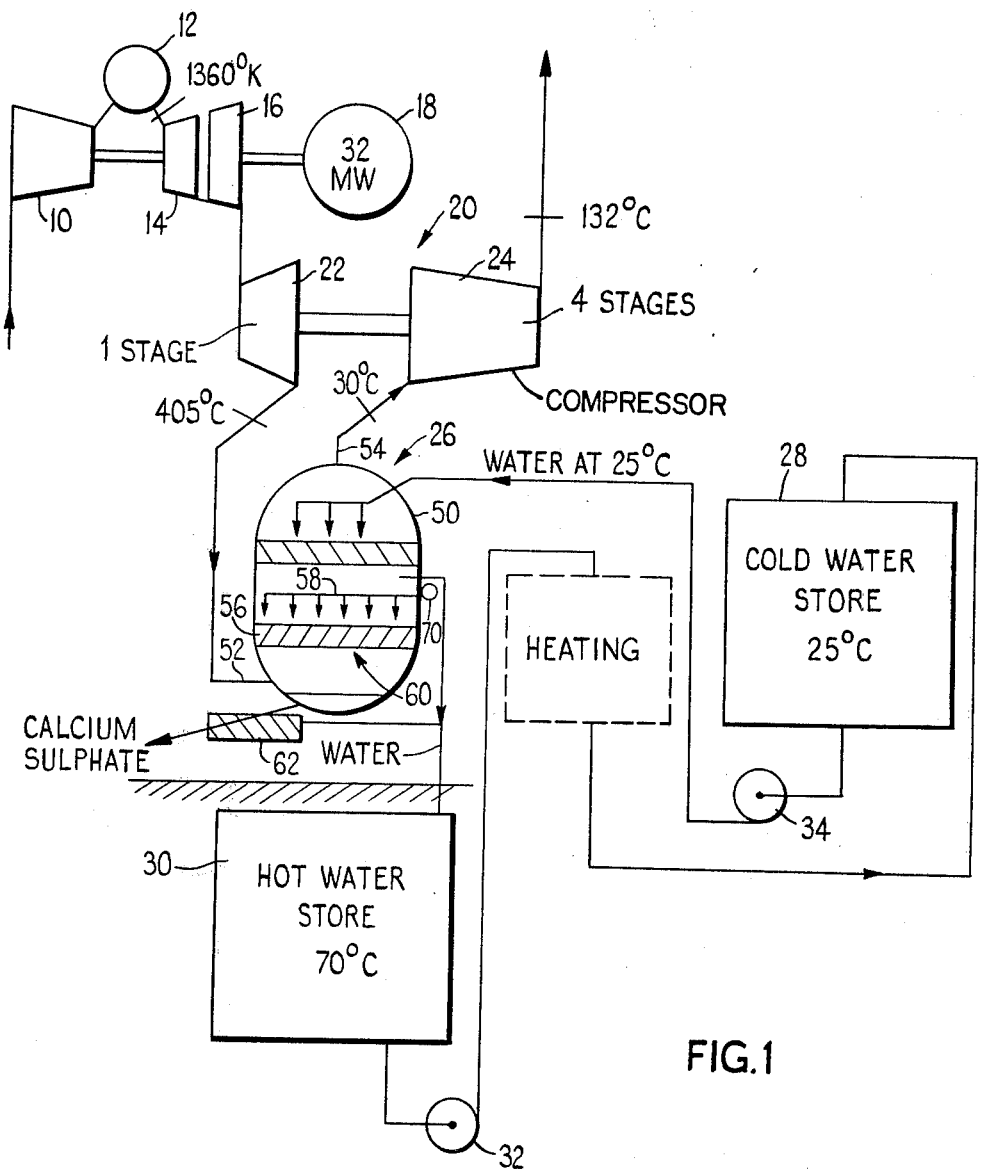

United States Patent [19]

Williams et al.

[11] 3,962,864

[45] June 15, 1976

[54] GAS TURBINE POWER PLANT WITH EXHAUST TREATMENTS FOR SO$_2$ REMOVAL

[75] Inventors: David Eyre Williams, Brinklow; Albert Jubb, Kenilworth, both of England

[73] Assignee: Rolls-Royce (1971) Limited, London, England

[22] Filed: Sept. 13, 1974

[21] Appl. No.: 505,948

[30] Foreign Application Priority Data

Sept. 20, 1973 United Kingdom............... 44079/73

[52] U.S. Cl............................ 60/39.16 R; 60/39.5; 23/284; 423/242; 165/107
[51] Int. Cl.² ...................... F02G 3/00; F02C 7/08; C01B 17/00
[58] Field of Search .............. 60/39.5, 39.18 B, 320, 60/310, 309, 39.16 R; 23/285, 284; 423/242; 165/107

[56] References Cited
UNITED STATES PATENTS

| | | | |
|---|---|---|---|
| 937,879 | 10/1909 | Smith.................. | 60/320 X |
| 2,021,936 | 11/1935 | Johnstone............ | 423/242 |
| 2,080,779 | 5/1937 | Lessing................ | 423/242 |
| 2,802,334 | 8/1957 | Fletcher et al........ | 60/39.16 R |
| 2,926,999 | 3/1960 | Tarbutton et al..... | 423/242 |
| 3,369,361 | 2/1968 | Craig................... | 60/39.5 |
| 3,786,635 | 1/1974 | Kates et al........... | 60/278 |
| 3,836,630 | 9/1974 | Noguchi et al....... | 423/242 |

FOREIGN PATENTS OR APPLICATIONS

775,600    5/1957    United Kingdom................. 165/107

*Primary Examiner*—Carlton R. Croyle
*Assistant Examiner*—Thomas I. Ross
*Attorney, Agent, or Firm*—Cushman, Darby & Cushman

[57] ABSTRACT

An energy system consists of a gas turbine engine having a power turbine which is arranged to drive a load, the exhaust from the power turbine passes to a further turbine which is arranged to drive a compressor, the exhaust from the further turbine passes to atmosphere via the compressor and a combined cooler and scrubber in which water is heated and sulphur is removed from the hot exhaust gas. The combined cooler and scrubber consists of a bed of flints through which the hot exhaust gas flows and a condenser arranged to receive a supply of relatively cool water, the resulting hot water being stored in a hot water store. The bed of flints also receives a supply of water to which calcium carbonate and manganese sulphate has been added so that sulphur in the form of calcium sulphate is removed from the exhaust gas.

3 Claims, 2 Drawing Figures

3,962,864

GAS TURBINE POWER PLANT WITH EXHAUST TREATMENTS FOR SO₂ REMOVAL

This invention relates to a gas turbine engine cycle and is particularly though not exclusively concerned with providing a binary cycle gas turbine engine whose shaft power is used to generate peaking electricity and to produce energy in the form of hot water which may be used for a district heating system.

The cycle uses a combined cooler and scrubber which provides both hot water for storage and a means of reducing the sulphur content of the gas turbine engine exhaust to a low level.

According to one feature of the present invention, there is provided an energy system comprising a gas turbine engine which includes in flow series, first compressor means, combustion means, first compressor driving turbine means arranged to drive the first compressor means, power turbine means which are arranged to drive a load and second compressor driving turbine means arranged to drive a second compressor means, the second compressor driving turbine means being arranged to receive the exhaust from the power turbine means, the exhaust from the second compressor driving turbine means being arranged to pass to atmosphere via a combined cooler and scrubber means and the second compressor means.

The combined cooler and scrubber means is preferably arranged to receive a supply of cooling water from a store which is arranged to cool the relatively hot exhaust gas from the second compressor driving turbine means. The cooling water is converted to steam which is then condensed and the resulting hot water is then passed to a hot water store from where it may be used for example, in a district heating system.

In a preferred arrangement, the water in the hot water store is pumped to a heat exchanger where the heat is removed for the desired use and then passes to the cooling water store.

The hot water store may comprise a concrete vessel located underground.

According to a further feature of the invention, there is provided a combined cooler and scrubber which comprises a housing in which are located means for removing pollutants from the exhaust of a prime mover and means for cooling the exhaust of a prime mover. In a preferred arrangement, the prime mover consists of a gas turbine engine.

The means for removing pollutants from the hot exhaust may be arranged to receive a supply of water which is converted to steam and then condensed, the resulting water is collected and passed to store.

The means for removing pollutants may comprise a bed of flints and the supply of water may receive pre-determined quantities of calcium carbonate and manganese sulphate prior to entry to the combined cooler and scrubber.

The steam may be condensed in a Knitmesh (Trade Mark) matrix which receives cooling water from the cold water store and collected in trays placed under the matrix.

The bed of flints may be intermittently fluidised by a jet of water so that calcium sulphate formed in the bed can be removed in the form of a slurry. The slurry can then be passed to a centrifuge where the water is removed and re-cycled to the bed of flints.

The present invention will now be more particularly described with reference to the accompanying drawings in which:-

Figure 2:
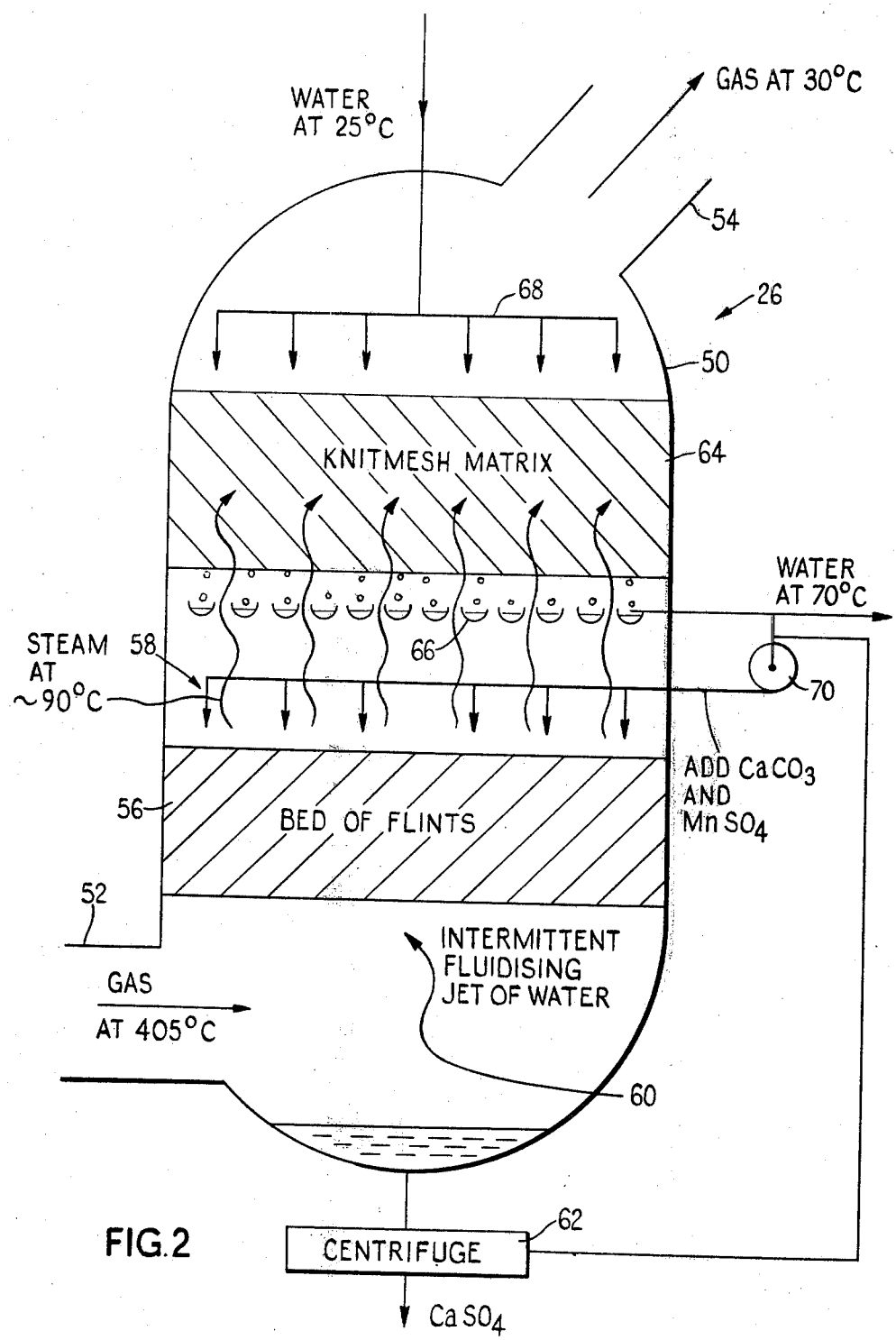

FIG. 1 shows in a diagrammatic layout one form of gas turbine engine cycle according to the present invention, and FIG. 2 shows a diagrammatic section of a combined cooler and scrubber for use with the cycle shown in FIG. 1.

Referring to FIG. 1 a gas turbine engine cycle comprises a gas turbine engine consisting of a compressor 10, combustion equipment 12, compressor driving turbine 14, and a power turbine 16 which is arranged to drive an alternator 18. The exhaust from the power turbine passes to an inverted gas turbine 20 which comprises a compressor driving turbine 22 which is arranged to drive a compressor 24.

The exhaust from the turbine 22 passes to a combined cooler and scrubber 26, the construction and operation of which will be described later with reference to FIG. 2. The sulphur contained in the hot exhaust gas is removed in the lower half of the cooler and scrubber and in the upper half, the hot gas is used to heat a supply of water from a cold water store 28.

The heated water passes from the cooler and scrubber to a hot water store 30 which is preferably a concrete vessel buried underground. When required, the hot water can be pumped by a pump 32 to a heat exchanger where the heat may be given up for use in a district heating system and then to the cold water store 28. The water from the cold water store 28 is pumped to the cooler and scrubber 26 by a pump 34.

The cooled gas passes to the compressor 24 where it is compressed to at least atmospheric pressure at a temperature which assists rapid dispersion of the cleaned exhaust into the atmosphere.

Referring to FIG. 2, the combined cooler and scrubber 26 comprises a vessel 50 having an inlet duct 52 and an exhaust duct 54 for the entry of the hot exhaust gas from the turbine 22 and the exhaust of the cooled gas respectively. A bed of small flints 56 is located in the lower half of the cooler and scrubber and is arranged to be sprayed by water passing through a spray system 58. Pre-determined quantities of calcium carbonate and manganese sulphate are added to the spray water.

A jet of water 60 is used intermittently to fluidise the bed of flints. The sulphur bearing gas is admitted to the duct 52 and passes upwards through the bed of small flints 56 which are capable of being fluidise by the jet of water 60 from beneath. The absorption of $SO_2$ and its conversion to calcium sulphate occurs in this bed by arranging for a scrubbing action between the water, to which a slurry of powdered chalk and manganese sulphate is added, and the gas.

Manganese sulphate is added with the calcium carbonate to promote the oxidation of the sulphite by catalytic action. The flow of scrubbing water is adjusted to produce an upward current of steam (at 90°C) leaving a fairly concentrated slurry of calcium sulphate in the pebble bed. Occasional stirring of the pebble bed by the water jets from beneath releases the concentrated slurry. The slurry is then passed to a centrifuge 62 where the water and calcium sulphate are separated out and the water is returned back to the spray system.

The upper part of the cooler and scrubber 26 contains the cooler which consists of a Knitmesh (Trade Mark) matrix 64 below which are located a number of trays 66 arranged to receive heated water. Knitmesh is a mesh structure of asymmetrical interlocking loops knitted from metals and plastics, the wire of which can be round or flattened and the mesh can be crimped. While the matrix 64 is preferably formed from a Knitmesh material, any matrix which can act both as an efficient separator and heat exchanger can be used. Cold water from the cold water store 28 flows over the matrix 64 via a spray system 68.

The flow of scrubbing water produces an upward current of steam at 90°C which flows through the matrix and heats the downward flow of cold water. The heated water is collected in the trays 66 from where it is passed to the hot water store 30.

Any condensate not collected in the trays 66 falls under gravity into the scrubber where heat from the incoming gas stream evaporates it together with the water content of the alkaline solution.

A small proportion of the heated water is tapped off and pumped by a pump 70 into the spray system 58 for the absorption bed.

Final separation of the liquid droplets from the stream entering the secondary compressor is achieved by an inertial separator of the type developed for gas turbine intakes e.g. a Darchem Steinmuller design. Such can have a separation efficiency above 0.999. Thus the final carry over into the compressor is very small.

A tapping from the final separator would be used to provide water for NOx suppression in the primary zone of the combustion chamber.

A further possibility is the use of the separated water to provide steam cooling of engine flame tubes.

The cycle proposed provides a means of generating peaking electrical supply which is both integrated into a total energy system and produces a low emission of atmospheric pollutants.

The cycle contains no heat exchangers other than a direct water cooler so that the cost of conventional exchangers are avoided and the plant is capable of rapid load take-up.

The plant does not depend on external water resources other than for a small water make-up.

Compared with a gas/steam cycle, the gas/gas cycle has a lower thermal efficiency but the former requires two large heat exchangers and a relatively large number of expansion stages on the steam side. Also the gas/steam cycle cannot rapidly take on full load and the gas/gas cycle rejects its heat at 70°C compared with 30°C for the gas/steam cycle.

We claim:
1. An energy system comprising a gas turbine engine including a first compressor means, a combustion means receiving the output of said first compressor means, a first turbine means connected to said combustion means for driving said first compressor means, a power turbine means, and a load driven by said power turbine means, a second compressor means, a second turbine means for driving said second compressor means, a housing, means within said housing for cooling the exhaust gases from said second turbine means, said cooling means including a heat exchanger matrix positioned in said housing, a cold water store, a hot water store, and means for conveying a supply of cold water from said cold water store to said housing, said cold water cooling the hot exhaust gases from said second turbine means in said heat exchanger matrix positioned in said housing, means in said housing for removing pollutants from said exhaust gases, the hot exhaust gases from said power turbine flowing to said housing by way of said second turbine, and flowing from said housing to the atmosphere by way of said second compressor means, said pollutant removing means receiving said water from said heat exchanger matrix and converting said water into steam which thereafter flows back to said matrix--., said steam condensing in the heat exchanger matrix, and means for collecting and passing said condensed steam to said hot water store.

2. An energy system as claimed in claim 1, wherein the means for removing pollutants from the gas turbine engine exhaust gas comprises a bed of flints arranged to receive said exhaust gases, means for supplying water to which has been added suitable amounts of $CaCo_3$ and $MnSO_4$ to said bed of flints so that a slurry of $CaSO_4$ is formed in the flint bed, means for removing said slurry from the bed by intermittently directing water jets into the bed, a centrifuge, means for passing the resulting diluted slurry to said centrifuge, said centrifuge separating the water and $CaSO_4$, and means for returning said water to the water supply for the flint bed.

3. The energy system of claim 1 further comprising a second heat exchanger for cooling water, means for passing said hot water in said hot water store to said second heat exchanger, and means for passing the water cooled in said heat exchanger to said cold water store, the heat removed in the heat exchanger being used for domestic district heating.

* * * * *

UNITED STATES PATENT OFFICE
CERTIFICATE OF CORRECTION

Patent No. 3,962,864　　　　　　　　　　Dated　June 15, 1976

Inventor(s) David Eyre Williams et al.

It is certified that error appears in the above-identified patent and that said Letters Patent are hereby corrected as shown below:

Column 4 line 26, has been changed to read -- thereafter flows back to said matrix, said stream con- --.

Signed and Sealed this

Sixteenth Day of November 1976

[SEAL]

Attest:

RUTH C. MASON
*Attesting Officer*

C. MARSHALL DANN
*Commissioner of Patents and Trademarks*